United States Patent [19]
Krolopp et al.

[11] Patent Number: 4,811,377
[45] Date of Patent: Mar. 7, 1989

[54] SECURE TRANSFER OF RADIO SPECIFIC DATA

[75] Inventors: Robert K. Krolopp, Hoffman Estates; Thomas J. Auchter, Barrington; Gary J. Pregont, Elgin; Ezzat A. Dabbish, Buffalo Grove, all of Ill.

[73] Assignee: Motorola, Inc., Schaumburg, Ill.

[21] Appl. No.: 80,711

[22] Filed: Jul. 31, 1987

[51] Int. Cl.$^4$ ............................................... H04Q 7/04
[52] U.S. Cl. ......................................... 379/62; 379/58; 340/825.34; 380/23; 380/3; 235/379
[58] Field of Search .................... 380/3, 4, 23, 25; 235/379, 380, 375; 379/88, 89, 114, 62, 58, 56, 63; 340/825.34; 455/33, 54, 56

[56] References Cited

U.S. PATENT DOCUMENTS

| | | | |
|---|---|---|---|
| 4,218,582 | 8/1980 | Hellman et al. | |
| 4,281,216 | 7/1981 | Hogg et al. | 178/22.08 |
| 4,481,382 | 11/1984 | Villa-Real | |
| 4,554,410 | 11/1985 | Furumoto | |
| 4,574,163 | 6/1986 | Zato | |
| 4,578,532 | 3/1986 | Markwitz | 178/22.13 |
| 4,593,155 | 6/1986 | Hawkins | |
| 4,594,591 | 6/1986 | Burke | |
| 4,622,695 | 11/1986 | Whiting | |
| 4,628,478 | 12/1986 | Henderson, Jr. | |
| 4,665,376 | 5/1987 | Dieleman | 380/23 |
| 4,677,670 | 6/1987 | Henderson, Jr. | 380/23 |
| 4,688,250 | 8/1987 | Currington | 380/23 |
| 4,708,375 | 10/1987 | Reed | 379/61 |
| 4,720,860 | 1/1988 | Weiss | 380/23 |
| 4,731,813 | 3/1988 | Schroeder | 379/62 |
| 4,731,841 | 3/1988 | Rosen | 380/23 |
| 4,734,569 | 3/1988 | Kawana et al. | 235/487 |
| 4,736,404 | 4/1988 | Anglikowski et al. | 379/62 |

FOREIGN PATENT DOCUMENTS 0054750  3/1986  Japan ........................................ 379/62
2118340 10/1983  United Kingdom .

OTHER PUBLICATIONS

Baroncini et al, "Inexpensive Digital Excription System for Cordless Telephone Secrecx" *Electrical Communication* vol. 58, No. 1, 1983, pp. 141–142.

Hellman, The Mathematics of Public Kety Cryptography, *Scientific American*, vol. 241, No. 2, Aug. 1979, pp. 146–157.

Fisher, "A Subscriber Set for the Equipment Test", *Bell System Technical journal* vol. 58, No. 1, Jan. 1979, pp. 123–143.

Electronic Industries Aaaociation, "EIA Interium Standard IS-E-B2", Jul. 1984, Section 2.3, pp. 2–5 to 2–8.

Intel Corp: "Memory Components Handbook", 1985, pp. 4–124 to 4–133.

"Cellular Fraud Preventable", Cellular Business, Jun, 1987 p. 34.

*Primary Examiner*—Robert Lev
*Attorney, Agent, or Firm*—Raymond A. Jenski; Rolland R. Hackbart

[57] ABSTRACT

The apparatus and method for transferring radio specific data from the memory of an integral logic unit of a radiotelephone to a second, replacement, memory is disclosed. Security of the data is realized by encoding the radio specific data with an operative number generated from a seed number. If the radio specific data is properly transferred to the second memory, the radio specific data is deleted from the memory of the integral logic unit.

25 Claims, 10 Drawing Sheets

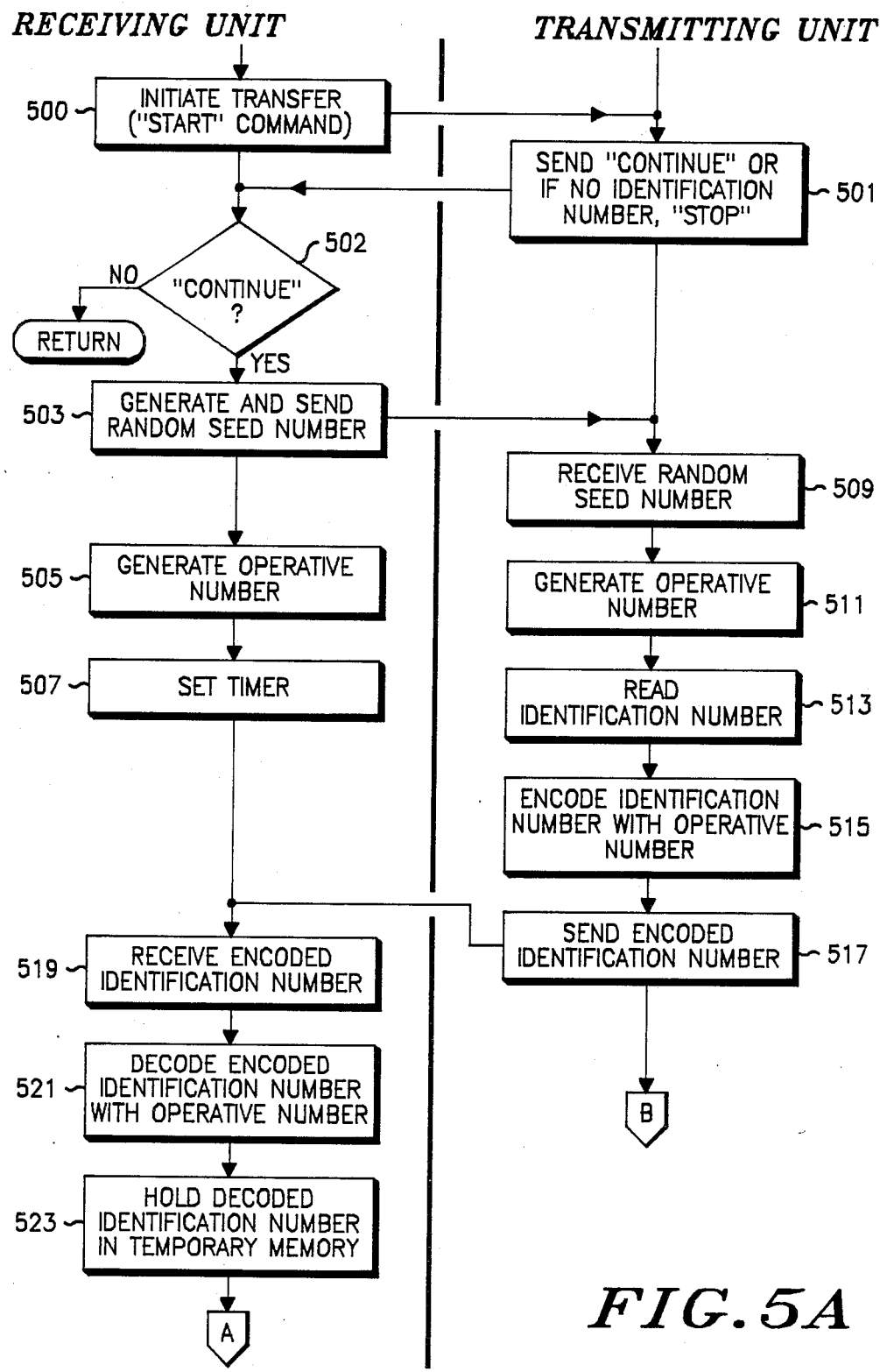

*TRANSMITTING UNIT*

SECURE TRANSFER OF RADIO SPECIFIC DATA

BACKGROUND OF THE INVENTION

This invention relates generally to apparatus and method for transferring specific radio configuration data from one radio microcomputer to another and more particularly to radiotelephone system subscriber radio transceivers having the capability for effecting a secure transfer of the radio-specific configuration parameters stored in transceiver microcomputer memory from one memory to another, replacement, memory.

Microprocessor controlled radio transceivers offer substantial flexibility in their operational characteristics such as the selection of radio channels for transmission and reception, the determination of transceiver individual or group identification, or the provision of specific options to satisfy a particular user. Generally, the programming of such characteristics or configurations are accomplished via a memory device coupled to the data bus of the microprocessor. In some applications, the memory device is a ROM which may be programmed once and coupled to the microprocessor bus. Alternatively, reprogrammable memory devices (EEPROMs) may be programmed many times to add user functions or to modify individual or group identity. Modification of a unit's identification has been shown in U.S. Pat. No. 4,593,155 while modification of other parameters has been shown in U.S. patent application Ser. No. 815,472 filed on behalf of Snowden et al. on Dec. 31, 1985. Remote reconfiguration of a unit has been shown in U.S. patent application Ser. No. 770,037 filed on behalf of Comroe et al. on Aug. 27, 1985.

In those applications where the programming of features or identification in the microprocessor system activates features for which the user pays a premium or provides service billing information, the service provider desires to protect the programming from tampering. The cellular radiotelephone system offers a good example of both such feature and identification programming. The telephone number of a mobile or portable cellular radiotelephone and operational characteristics are mapped into an electronic mobile identification number. The storage medium is then affixed to the radiotelephone unit in such a manner that attempted removal or tampering causes destruction of the medium. Greater detail is provided in Electronic Industries Association Interim Standard IS-3-B, Section 2.3, July 1984.

Unfortunately, enterprising individuals have been able to alter the memory storage devices and fraudulently obtain radiotelephone service. Equipment manufacturers have attempted to further combat this alteration by encoding the stored information in a manner that makes alteration very difficult. (See Cellular Fraud Preventable", *Cellular Business,* June 1987, pg. 34).

This solution spawns a different problem. When a radiotelephone unit is brought to a repair facility for repair, the radiotelephone user naturally wishes his unit returned as quickly as possible. The miniaturization of the radiotelephone unit has compressed many functions into field-replaceable modules so that it is expeditious to replace a module and return the user to service quickly and attempt troubleshooting and repair of a defective component at a later time. If the replaced module contains the storage medium with the identification number and the number is encoded with a security algorithm, replacement of the module will not return the unit to operation. Broadcast of the encoding algorithm to many service centers defeats the purpose of the security encoding. Thus, there is a need for the equipment and process which prevents tampering and alteration of unit identification while allowing easy and inexpensive unit repair.

SUMMARY OF THE INVENTION

Therefore, it is one object of the present invention to provide secure storage of mobile and portable radiotelephone unit identification and operational characteristics in a memory medium.

It is another object of the present invention to enable the reading of the identification and operational characteristics from the storage medium of a radiotelephone unit being repaired and the secure transfer of these data into the storage medium of another radiotelephone unit.

It is a further object of the present invention to encode the identification and operational characteristics data during data transfer from one radiotelephone unit to another.

Accordingly, these and other objects are accomplished in the present invention which encompasses a radiotelephone unit having specific identifying data stored in a first memory which is to be transferred in a secure fashion to a second memory. The method and apparatus for transferring the specific identifying data requires that a seed number be received from the microcomputer associated with the second memory thereby initiating the transfer. The specific identifying data is read from the first memory and encoded by an arithmetic combining of the specific identifying data with an operative number generated from the seed number. The encoded specific data is sent to the microcomputer associated with the second memory and, in response, a verification is generated and returned to the microcomputer associated with the first memory. The verification is tested and if the verification is correct, the specific identifying data is deleted from the first memory. Alternatively, the microcomputer associated with the second memory may return a validity pass message, the receipt of which results in the deletion of the specific identifying data from the first memory.

DESCRIPTION OF THE PREFERRED EMBODIMENT

Figure 1:
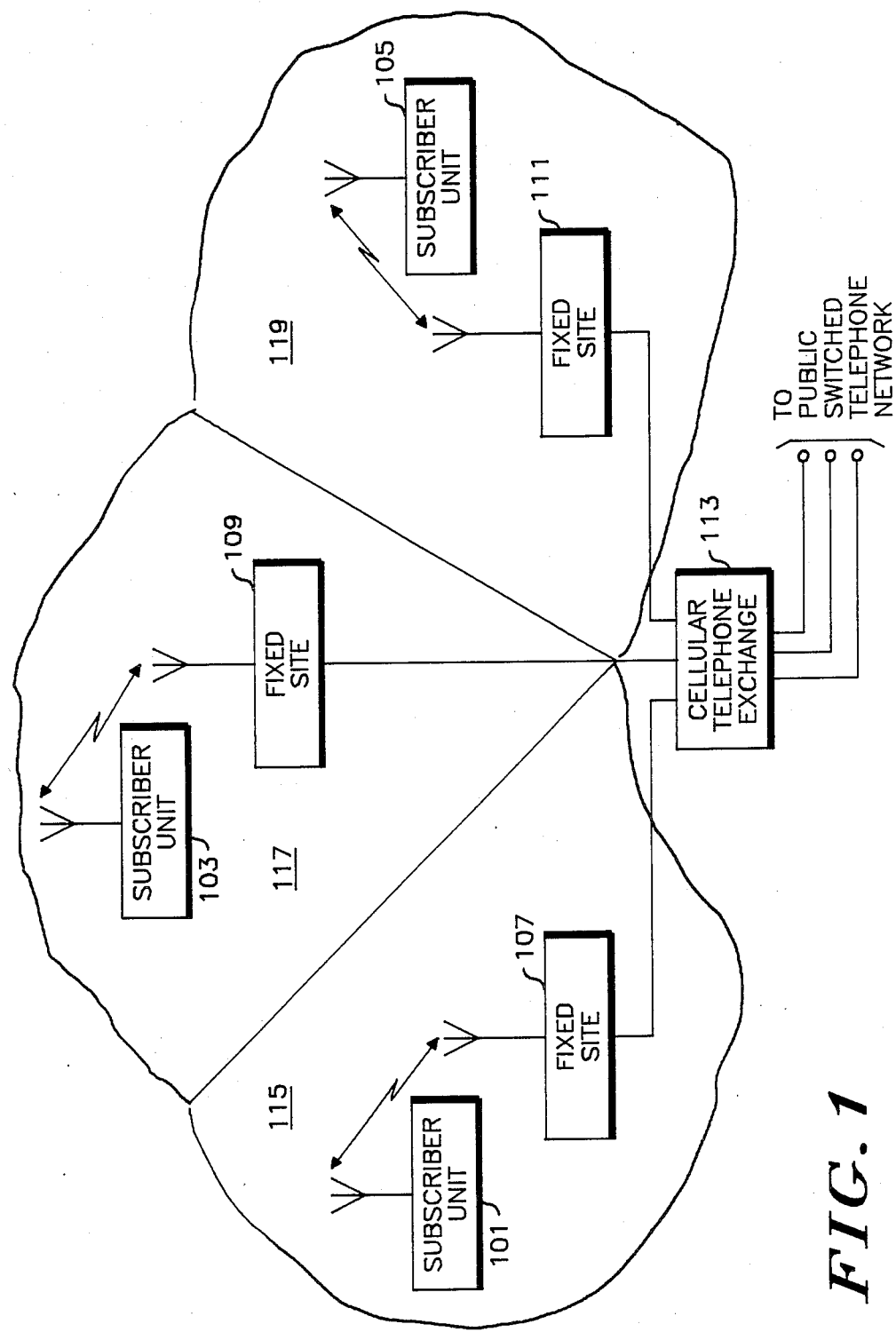
FIG. 1 is a block diagram of the basic elements of a cellular radiotelephone system which may employ the present invention.

A radio system employing the present invention may be one such as shown in FIG. 1. In this embodiment a cellular radiotelephone system provides two-way radio telephone communications between the public switched telephone network and one or more subscriber units. A subscriber unit, such as unit 101, or 103, or 105, may communicate via radio to one of the fixed sites (107, 109, or 111), which in turn couples two-way communication through a cellular telephone exchange 113 which performs the operation of call placement, control, and interconnection with the public switched telephone network. As is well known, cellular systems are divided into discrete radio coverage areas, cells, to provide radio coverage over a wide geographic area. Such cells are diagrammatically shown in FIG. 1 as areas 115, 117, and 119.

Each subscriber unit is given a unique telephone directory number, corresponding to the telephone number which would be dialed in the public switched telephone network, to access the communications link which would couple the subscriber unit to the appropriate telephone line. The telephone directory number is included as part of an identification serial number which is a unique and permanent part of the subscriber unit.

Figure 2:
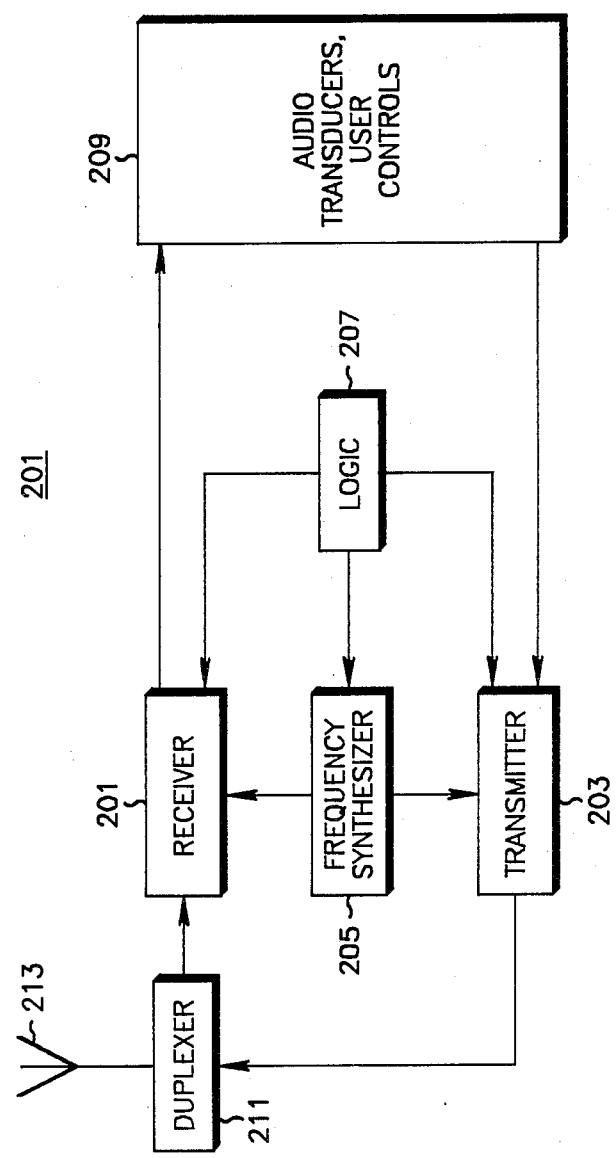
FIG. 2 is a block diagram of a mobile or portable radiotelephone unit which may employ the present invention.

A subscriber unit which may advantageously employ the present invention is shown in the block diagram of FIG. 2. One such subscriber unit may be a commercially available radiotelephone transceiver such as a Model No. F19ZEA8439BA manufactured by Motorola, Inc. Such a radio transceiver consists of a receiver portion 201, a transmitter portion 203, and frequency synthesizer portion 205, a logic portion 207, and audio transducers and user controls 209. A duplexer 211 couples an antenna 213 to the receiver portion 201 and couples a transmitter 203 to the antenna 213 in such a manner that receiver signals and transmit signals may be received and transmitted essentially without interference to each other.

The present invention resides primarily in the logic portion 207. A block diagram of the logic portion 207 employing the present invention is shown in more detail in FIG. 3. In the preferred embodiment, the logic portion 207 is a microcomputer which consists primarily of a call processor microprocessor 301 (which may be a commercially available microprocessor such as an MC6805 available from Motorola, Inc. or equivalent), a signaling interface circuit 303, (which may be a custom integrated circuit providing address decoding, data decoding, and tone generation) and microprocessor memory. The microprocessor memory includes conventional 24K by 8 EPROM 305 containing the unique executive program, a ROM 306, conventional RAM 307, and EEPROM 309, containing, inter alia, the unique radio serial number assigned this particular radio. An audio processing interface 311 provides interface between the microcomputer bus and other radio transceiver functions. Interface between the microcomputer and the user controls/audio transducers portion 209 is accomplished, in the preferred embodiment, via a three wire computer bus such as that described in U.S. Pat. No. 4,369,516. Interface between the microcomputer and an external microcomputer (such as that which would temporarily be connected to receive radiospecific data) is accomplished via an RS232 interface. In the preferred embodiment, the RS232 interface and the user controls/audio transducers portion 209 interface is realized through connection to microprocessor 301.

Figure 3:
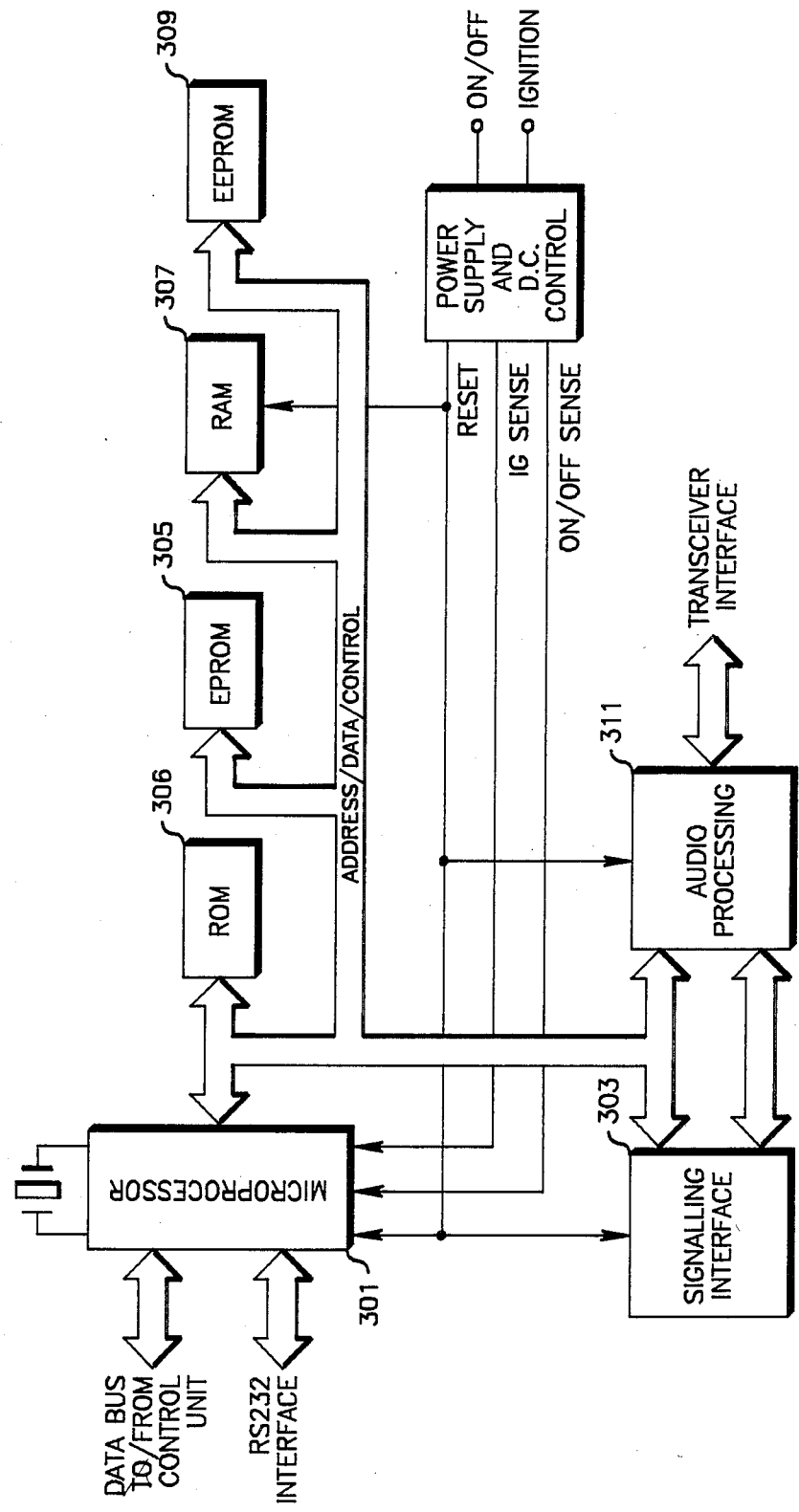
FIG. 3 is a block diagram of the logic unit portion of the radiotelephone unit of FIG. 2 which may employ the present invention.

In the preferred embodiment the entire microcomputer of FIG. 3 may be placed on a single printed circuit board module. It is likely, therefore, that any failure in the microcomputer system would initially be solved by replacement of an entire microcomputer circuit board. Since the identification number is an integral part of the microcomputer circuit board, removal of the microcomputer circuit board would render the transceiver unit without identification and thus incapable of operating in a radiotelephone system.

Figure 4:
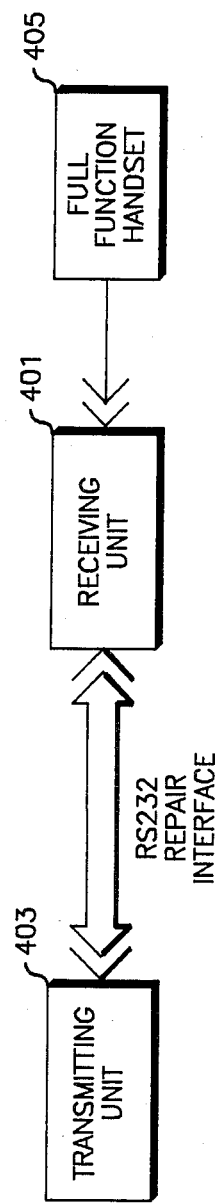
FIG. 4 is a block diagram of the essential elements necessary for transfer of radio specific data from one radiotelephone unit to another in accordance with the present invention.

A significant feature of the present invention, then, is that a replacement microcomputer circuit board may be interconnected with the defective microcomputer circuit board via the RS232 interface port on both microcomputer circuit boards. This interconnection is shown diagrammatically in FIG. 4.

The replacement microcomputer circuit board becomes the "receiving" unit 401 to receive the radiospecific identity of the subscriber unit transceiver and the defective microcomputer circuit board becomes the "transmitting" unit 403 to transmit the radio-specific identity. A full function handset 405 (such as that shown and described in "DYNA T-A-C Cellular Mobile Telephone 800 MHz Transceiver" Instruction Manual 68P81066E40-B, 1985, Motorola, Inc. Technical Writing Services, 1301 E. Algonquin Road, Schaumburg, Ill. 60196) is interconnected with the receiving unit circuit board 401 to initiate the transfer of radio-specific identity data by allowing the service personnel to enter an appropriate test command via a keypad in the handset 405.

Figure 5B:
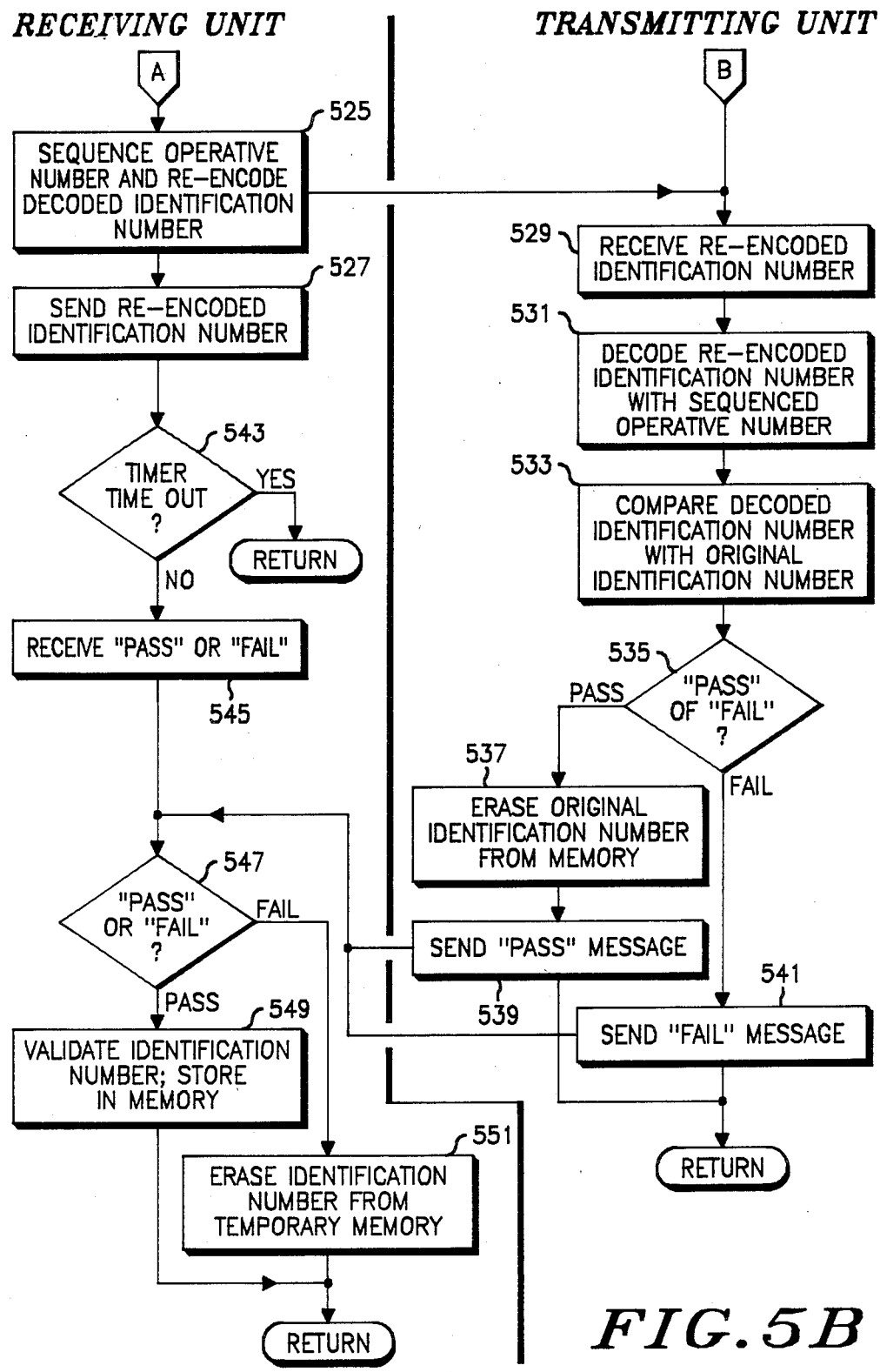
FIGS. 5A and associated, taken together, are a flowchart illustrating the process of transferring radio specific data from one radiotelephone unit to another in accordance with the, present invention.

The process by which the radio-specifio identity is transferred from one microcomputer to another is shown in FIGS. 5A and 5B. Upon the initiation of the transfer process by the repair personnel, the receiving unit (replacement microcomputer circuit board) 401 transmits a "start" command, at 500. The transmitting unit (defective microcomputer circuit board) 403 returns a "continue" command, at 501, if the radio-specific identity ("identification number") is present in the transmitting unit 403 memory. If an identification number is not present, a "stop" command is returned. If a "continue" command is received by the receiving unit 401, as determined at decision block 502, the receiving unit 401 conventionally generates a random seed number, which is then conveyed to the transmitting unit 403 via the RS232 interface (at 503). The receiving unit 401 then generates an operative number by a technique described later, at 505, and initiates a timer, at 507, which defines a time period during which the transmitting unit 403 should respond to the request for transfer. The transmitting unit 403, upon receiving the random seed number, at 509, generates an equivalent operative number at 511, recalls the unique subscriber unit identification number, at 513, from its associated memory, and proceeds to encode the identification number with the operative number at 515, using a process to be described later. The encoded identification number is then sent by the transmitting unit 403 at 517 via the RS232 interface to the receiving unit 401 where it is received, at 519. The receiving unit 401 then decodes the encoded identification number with the previously generated operative number, at 521. This decoded identification number is held in the temporary memory associated with the receiving unit 401 microprocessor, at 523.

Referring now to FIG. 5B, the receiving unit 401 re-encodes the decoded identification number, at 525, by sequencing the operative number through one or more iterations to further preserve security and arithmetically combining the decoded identification number and the sequenced operative number. The receiving unit 401 subsequently sends the re-encoded identification number to the transmitting unit 403 (at 527). The transmitting unit 403, upon receiving the re-encoded identification number (at 529) decodes the re-encoded identification number with the operative number which has been sequenced in a manner like that of the receiving unit 401, at 531. The decoded re-encoded identification number is then compared with the original identification number read from the transmitting unit 403 associated memory (at 533). If the comparison indicates the decoded identification number is equal to the original identification number, a decision is made that the identification number which was transmitted by the transmitting unit 403 to the receiving unit 401 has been correctly transferred. The original identification number is erased from the transmitting unit 403 associated memory, at 537, and a "pass" message is conveyed between the transmitting unit 403 and the receiving unit 401 (at 539). The deletion of the original identification number assures that additional copies of this particular identification number may not be made from the transmitting unit 403. If, however, the decision at block 535 is that the decoded identification number is not equal to the original identification number, a "fail" message is transmitted to the receiving unit 401 (at 541).

The receiving unit 401 awaits the determination by the transmitting unit 403 whether the identification number has been verified. If the verification does not occur within the time period determined by the timer (at 543) the transfer process is aborted. If a "pass" message or a "fail" message is received within the proper time (at 545) the receiving unit 401 proceeds to determine whether a "pass" or a "fail" message has been returned from the transmitting unit 403. If a "pass" message is received, the identification number in the memory associated with the microcomputer of the receiving unit is validated and stored in permanent memory (at 549). If, however, a "fail" message is received, the identification number previously held in the receiving unit temporary memory is erased at 551.

Figure 6A:
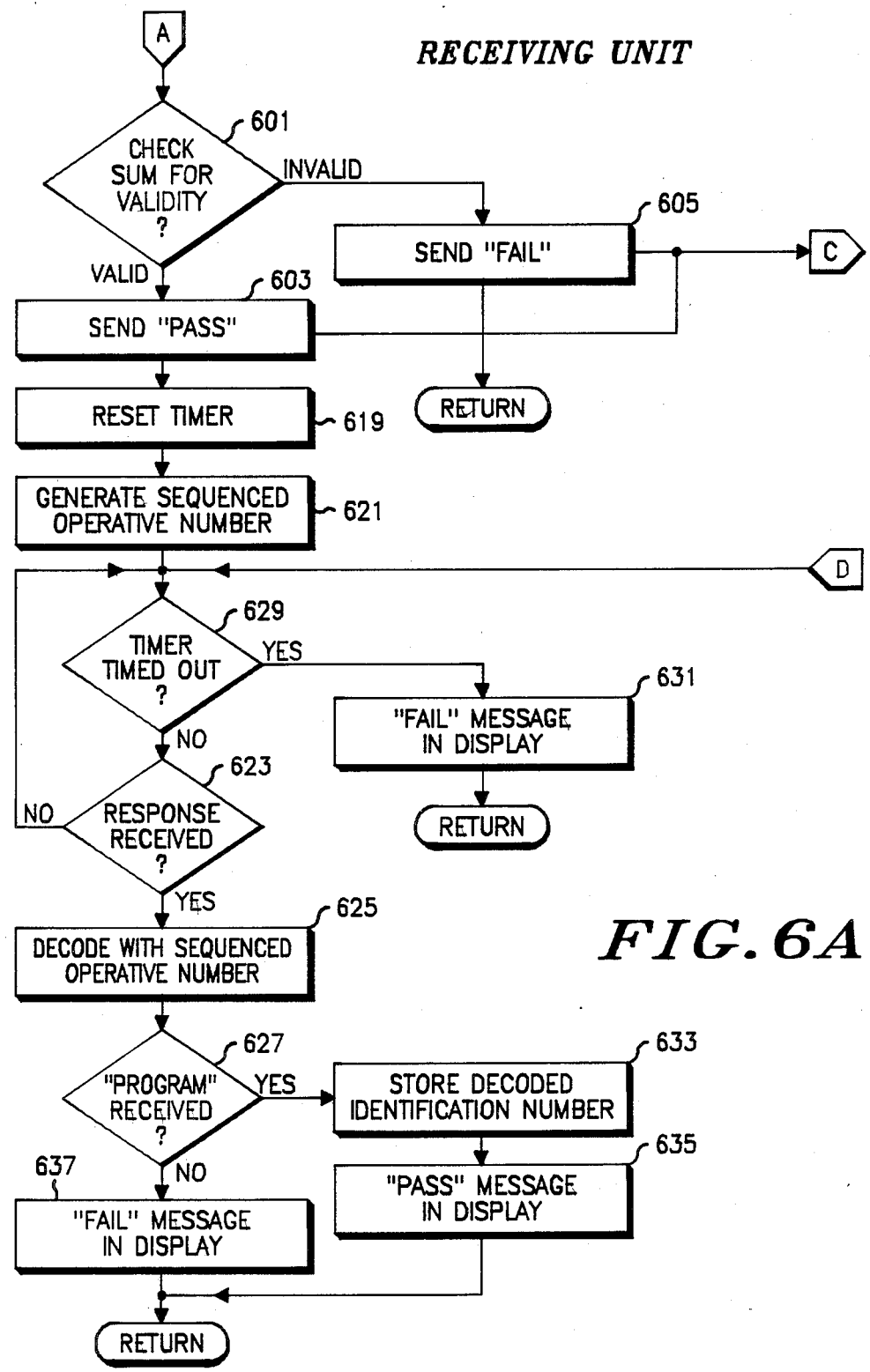
FIGS. 6A and 6B are a flowchart, showing an alternative process to that of FIG. 5B for transferring radio specific data from one radiotelephone unit to another in accordance with the present invention.
Figure 6B:
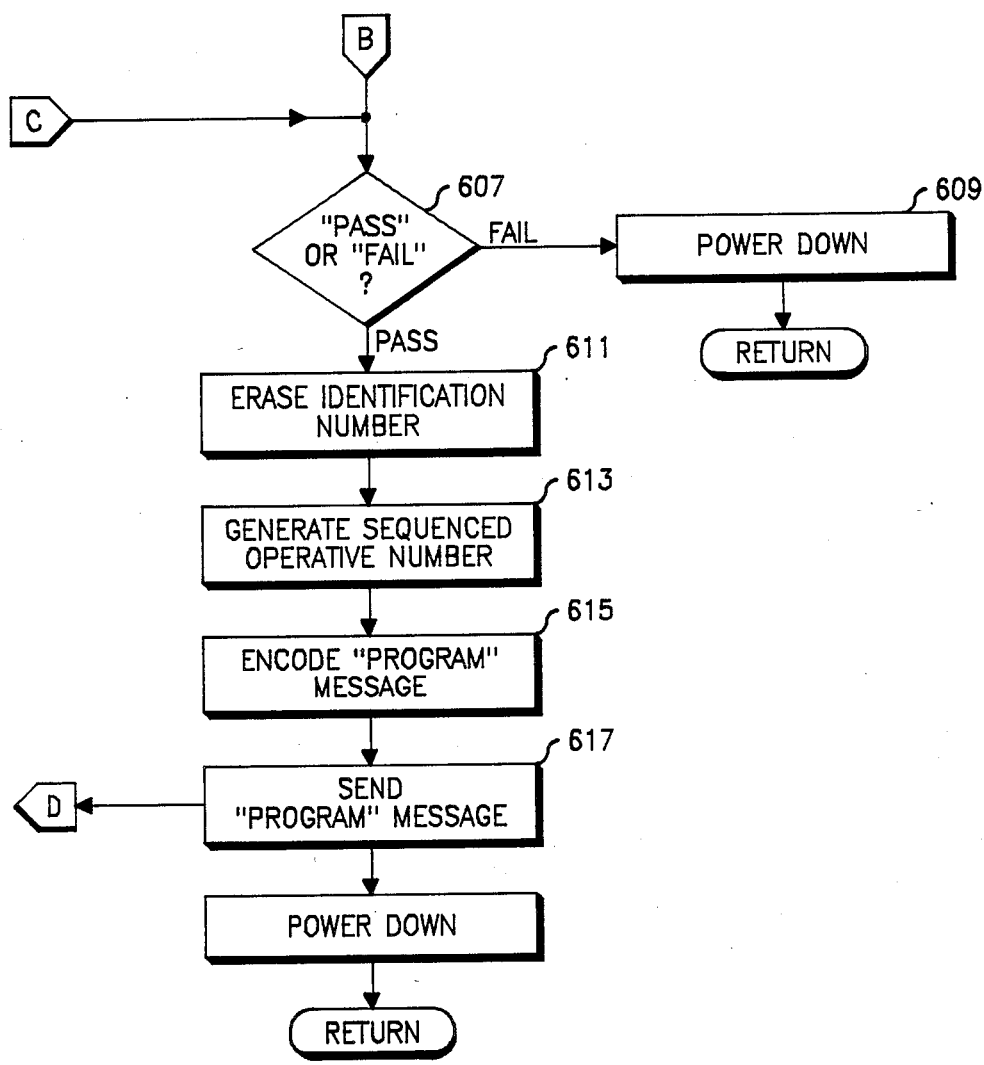

In certain instances it is desirable to conserve microcomputer memory space and an alternative embodiment, such as shown in FIGS. 6A and 6B, may be employed in the present invention. Upon the receiving unit 401 storing the decoded identification number in memory (at 523, FIG. 5A), the receiving unit 401 proceeds to conventionally test the check sum (at 601) sent as part of the format of the encoded identification number. If the check sum test indicates no errors, a "pass" message is sent to the transmitting unit 403 (at 603). If an error is detected in the check sum test, a "fail" message is sent (at 605).

The transmitting unit determines (at 607) whether a "pass" or "fail" message has been received and either shuts the power down (at 609) for a "fail" or erases the identification number (at 611) stored in the transmitting unit's memory for a "pass". The transmitting unit then proceeds to sequence the operative number (at 613) thereby generating another, sequenced, operative number with which to encode additional messages such as a "program" message, at 615. The encoded "program" message is subsequently sent to the receiving unit.

After sending the "pass" message (at 603), the receiving unit resets the time-out timer (at 619) and sequences the operative number in a manner identical to the transmitting unit to obtain the sequenced operative number (at 621). The receiving unit awaits a response from the transmitting unit (at 623) and determines whether a "program" message has been received by decoding the received message with the sequenced operative number (at 625) and checking for the "program" message (at 627). If a response is not received from the transmitting unit after a predetermined time determined by the time-out timer (at 629), a "FAIL" message is put into a display of the full function handset 405 (at 631).

Upon determining that a "program" message has been received, the decoded identification number is stored (at 633) in the memory of the receiving unit and a "PASS" message is placed in the display of handset 405 (at 635). Any other message detected at 627 will result in a "FAIL" message to be placed in the handset 405 display (at 637) and the transfer process to be aborted.

Figure 7:
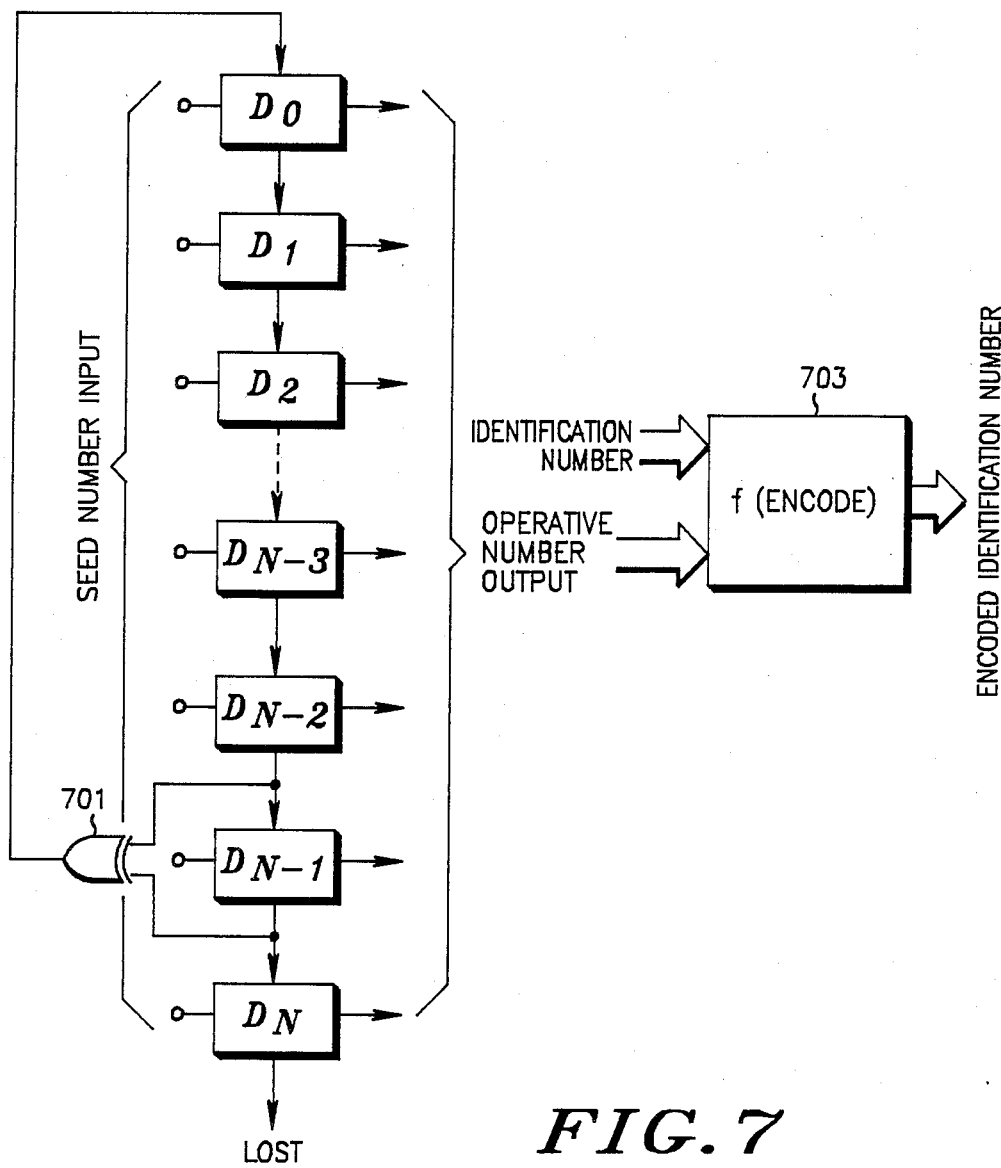
FIG. 7 is a diagram of an operative number generator and identification number encoder which may be employed in the present invention.

The process of generation of the operative number and its application to the encoding of the identification number is shown sequenced in FIG. 7. A series of storage means ($D_0$ through $D_N$) are coupled such that the state of the first storage means ($D_0$) can be transferred to the second storage means ($D_1$) etc. in a classic bucket brigade fashion. The output of the $D_{N-1}$ storage means and the $D_{N-2}$ storage means are exclusive OR-ed (in 701) to provide feedback to the $D_0$ storage means such that a new string of states may be generated when the storage means are caused to sequence. To begin the process of operative number generation, a seed number received from the receiving unit (as described previously) is input, state by state, into the $D_0$ through $D_N$ storage means. The coupled storage means may then be sequenced through a predetermined number of sequence cycles. The operative number may then be read from the states of the coupled storage means, as indicated. The number thus created is then combined with the identification number read from the memory of the previously described logic circuitry 207 using one or more arithmetic functions in arithmetic function process block 703. The output is the encoded identification number.

Figure 8:
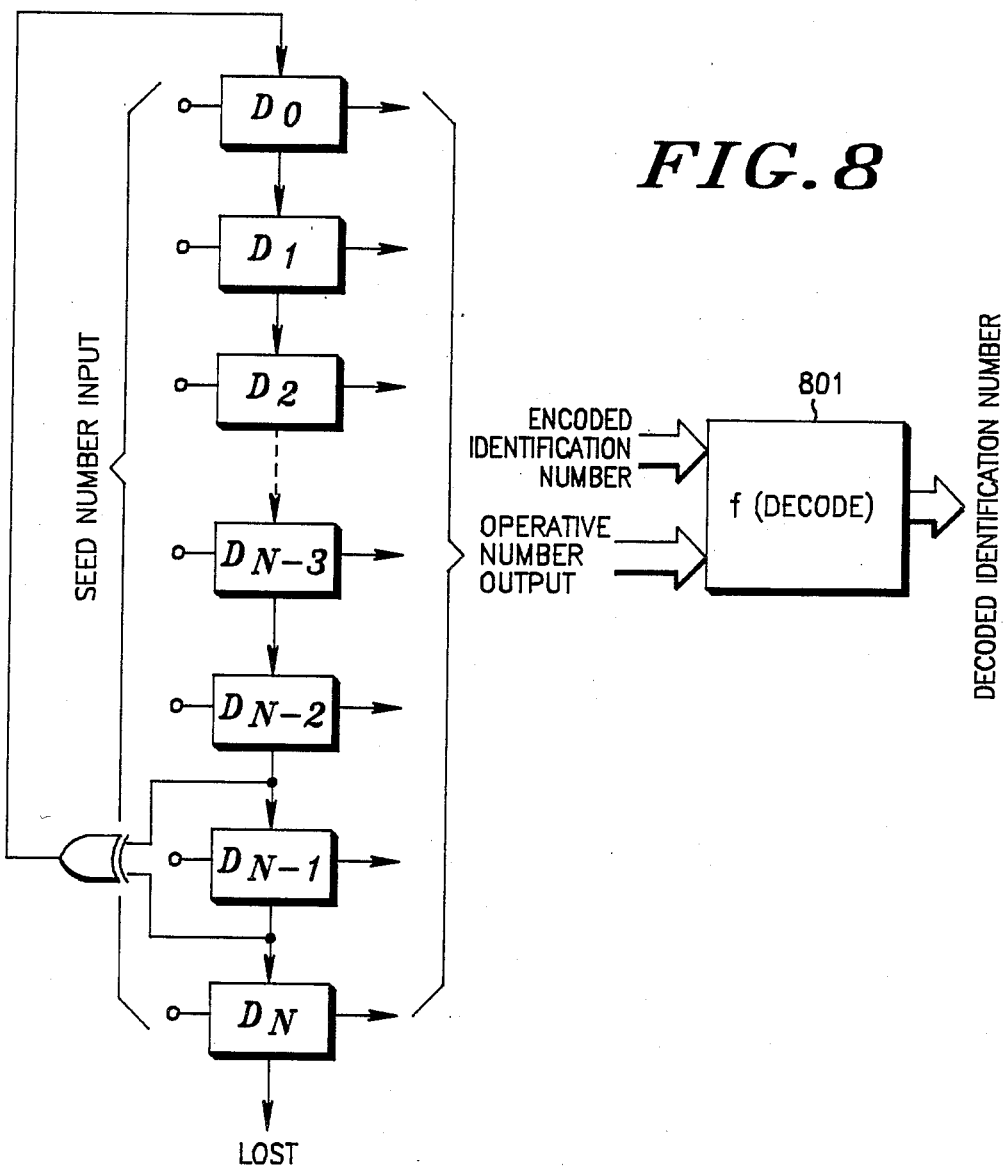
FIG. 8 is a diagram of an operative number generator and identification number decoder which may be employed in the present invention.

A complementary process occurs in the decoding operation shown in FIG. 8. The same seed number is input to the storage means and subjected to the same number of sequences to produce the same operative number. The operative number is applied to an arithmetic decode function 801 which reverses the encoding and yields the decoded identification number.

Similar encoding and decoding may be employed with any of the messages to be sent between transmitting unit and receiving unit. In the preferred embodiment, the identification number and the "program" message, each a minimum four byte message, are encoded with a sequencing of the operative number between the message transmissions. The seed number and the one byte messages start, stop, continue, fail, and pass are not encoded.

Figure 9:
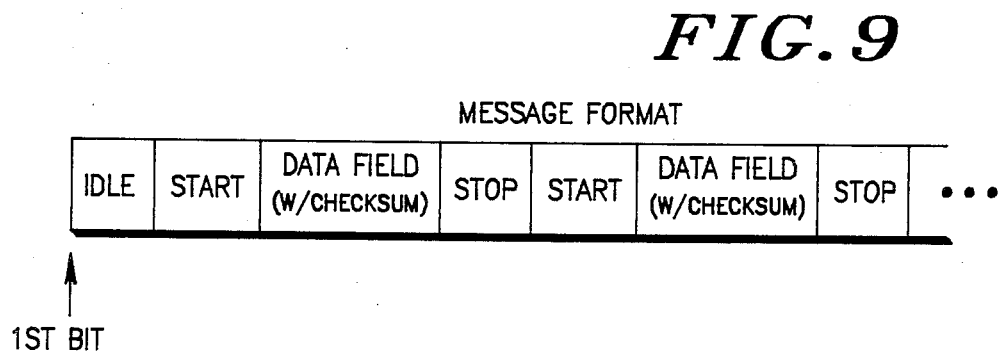
FIG. 9 is a diagram of a message format which may be employed in the present invention.

The message format employed in the present invention is shown in FIG. 9. An "idle" byte precedes the "start" byte which defines the commencement of the message—bearing data field. A check sum is included in the data field to identify errors. A stop byte defines the data field end. A plurality of data fields may be concatenated for longer messages.

In summary, then, the method and apparatus for effecting the secure transfer of radio specific data from the microcomputer memory of a radiotelephone to a second microcomputer and memory has been shown and described. The second microcomputer, which may be a replacement for a defective microcomputer, is coupled to the first microcomputer and generates and transmits a seed number to the first microcomputer. The first microcomputer reads the radio specific data, which may be an identification number or other performance configuration parameters, from the memory associated with the first microcomputer and encodes the radio specific data by arithmetic combination with an operative number generated from the seed number. The encoded radio specific data is then transmitted to the second microcomputer where the encoded data is decoded by a process complementary to the encoding process. Verification of a valid transfer may be accomplished by a re-encoding by the second microcomputer and a re-transmission to the first microcomputer or a transmission of a validity "pass" message from the second microcomputer to the first microcomputer. A successful transfer results in the radio specific data being deleted from the first microcomputer memory and being stored in the memory of the second microcomputer. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

We claim:

1. A radiotelephone unit having specific identifying data stored in a first memory medium associated with a first microcomputer and having capability to transfer the identifying data to a second memory medium associated with a second microcomputer, comprising:
   means for receiving a seed number from the second microcomputer whereby a request for transfer of the specific identifying data is initiated;
   means, responsive to said receiving a seed number, for reading the specific identifying data from the first memory medium;
   means for generating an operative number from said seed number;
   means for encoding said specific identifying data by arithmetically combining said operative number and the specific identifying data;
   means for sending said encoded specific identifying data to said second microcomputer and receiving a verification of said encoded specific identifying data;
   means for testing said verification; and
   means, responsive to said means for testing, for deleting the specific identifying data from the first memory medium if said testing shows a correct verification.

2. A radiotelephone unit in accordance with claim 1 wherein said means for receiving a verification further comprises:
   means for receiving second encoded specific identifying data; and
   means for decoding said second encoded specific identifying data using said operative number.

3. A radiotelephone unit in accordance with claim 2 wherein said means for testing further comprises:
   means for comparing said decoded second encoded specific identifying data to said specific identifying data to determine a correct verification; and
   means, responsive to said means for comparing, for sending a "pass" message to the second microcomputer if said decoded second encoded specific identifying data is essentially identical to the specific identifying data.

4. A radiotelephone unit in accordance with claim 3 wherein said means for testing further comprises means, responsive to said means for comparing, for sending a "fail" message to the second microcomputer if said decoded second encoded specific identifying data is not essentially identical to the specific identifying data.

5. A radiotelephone unit in accordance with claim 1 wherein said seed number is a randomly generated number.

6. A replacement microcomputer for a radiotelephone unit adapted to receive secure specific identifying data stored in a second radiotelephone microcomputer to be replaced and associated memory medium, comprising:
   means for generating a seed number;
   means for generating an operative number from said generated seed number;
   means, employing said operative number, for decoding specific identifying data encoded by and received from the second microcomputer;
   means for re-encoding said decoded specific identifying data by arithmetically combining said operative number and said decoded specific identifying data;
   means for receiving a "pass" message from the second radiotelephone microcomputer; and
   means, responsive to said "pass" message, for storing said decoded specific identifying data; and means for commanding said second radiotelephone microcomputer to delete said specific identifying data stored therein following said storing of said decoded specific identifying data in said replacement microcomputer.

7. A method of transferring specific identifying data from a radiotelephone unit having the specific identifying data stored in a first memory medium associated with a first microcomputer to a second memory medium associated with a second microcomputer, comprising the steps of:
   receiving a seed number from the second microcomputer whereby a request for transfer of the specific identifying data is initiated;
   reading the specific identifying data from the first memory medium in response to said receiving a seed number;
   generating an operative number from said seed number;
   encoding said specific identifying data by arithmetically combining said operative number and the specific identifying data;

sending said encoded specific identifying data to said second microcomputer and receiving a verification of said encoded specific identifying data;

testing said verification; and deleting the specific identifying data from the first memory medium in response to said means for testing if said testing shows a correct verification.

8. A method in accordance with the method of claim 7 wherein said step of receiving a verification further comprises the steps of:

receiving second encoded specific identifying data; and decoding said second encoded specific identifying data using said operative number.

9. A method in accordance with the method of claim 8 wherein said step of testing further comprises the steps of:

comparing said decoded second encoded specific identifying data to said specific identifying data to determine a correct verification; and sending a "pass" message to the second microcomputer in response to said comparing step if said decoded second encoded specific identifying data is essentially identical to the specific identifying data.

10. A method in accordance with the method of claim 9 wherein said step of testing further comprises the step of sending a "fail" message to the second microcomputer in response to said comparing step if said decoded second encoded specific identifying data is not essentially identical to the specific identifying data.

11. A method of receiving specific identifying data at a replacement microcomputer for a radiotelephone unit adapted to receive secure specific identifying data stored in a second radiotelephone microcomputer to be replaced, comprising:

generating a seed number;

generating an operative number from said generated seed number;

decoding specific identifying data encoded by and received from the second microcomputer by employing said operative number;

re-encoding said decoded specific identifying data by arithmetically combining said operative number and said decoded specific identifying data;

receiving a "pass" message from the second radiotelephone microcomputer; and storing said decoded specific identifying data in response to said "pass" message; and commanding said second radiotelephone microcomputer to delete said specific identifying data stored therein following said storing of said decoded specific identifying data in said replacement microcomputer.

12. A method of transferring radio specific data between a radiotelephone unit first microcomputer and associated memory and a second microcomputer and associated memory, comprising the steps of:

generating a seed number at the second microcomputer;

conveying said generated seed number to the first radiotelephone unit microcomputer;

generating an operative number from said generated seed number at the first microcomputer and the second microcomputer;

encoding the radio specific data from the first microcomputer associated memory by arithmetically combining said operative number and the radio specific data;

conveying said encoded radio specific data to the second microcomputer;

decoding said conveyed encoded radio specific data at the second microcomputer;

re-encoding said decoded radio specific data by arithmetically combining said operative number and said decoded radio specific data;

conveying said re-encoded radio specific data to the first microcomputer;

decoding said conveyed re-encoded radio specific data;

comparing, at the first microcomputer, said decoded re-encoded radio specific data to the radio specific data from the first microcomputer associated memory;

sending a "pass" message to the second microcomputer if said decoded re-encoded radio specific message is essentially identical to the radio specific data from the first microcomputer associated memory;

storing said decoded radio specific data in the second microcomputer associated memory in response to said "pass" message; and deleting the radio specific data from the first microcomputer memory if said decoded re-encoded radio specific message is essentially identical to the radio specific data from the first microcomputer associated memory.

13. A method in accordance with the method of claim 12 further comprising the step of sending a "fail" message to the second microcomputer if said decoded reencoded radio specific message is not essentially identical to the radio specific data from the first microcomputer associated memory.

14. A radiotelephone unit having specific identifying data stored in a first memory medium associated with a first microcomputer and having capability to transfer the identifying data to a second memory medium associated with a second microcomputer, comprising:

means for receiving a seed number from the second microcomputer whereby a request for transfer of the specific identifing data is initiated;

means, responsive to said receiving a seed number, for reading the specific identifying data from the first memory medium;

means for generating an operative number from said seed number;

means for encoding said specific identifying data by arithmetically combining said operative number and the specific identifying data;

means for sending said encoded specific identifying data to said second microcomputer;

means for receiving a validity pass message from said second microcomputer; and means, responsive to said validity pass message for deleting the specific identifying data from the first memory medium.

15. A radiotelephone unit in accordance with claim 14 further comprising means, responsive to said validity pass message, for sending a program message.

16. A radiotelephone unit in accordance with claim 15 further comprising means for encoding said program message with a second operative number.

17. A radiotelephone unit in accordance with claim 16 wherein said second operative number is generated by sequencing said seed number generated operative number.

18. A replacement microcomputer for a radiotelephone unit adapted to receive secure specific identifying data stored in a second radiotelephone microcomputer to be replaced, comprising:
   means for generating a seed number;
   means for generating an operative number from said generated seed number;
   means, employing said operative number, for decoding specific identifying data encoded by and received from the second microcomputer;
   means for temporarily storing said decoded specific identifying data;
   means for checking the validity of said decoded specific identifying data;
   means for receiving a program message from the second radiotelephone microcomputer; and
   means for permanently storing said temporarily stored decoded specific identifying data; means for commanding said second radiotelephone microcomputer to delete said specific identifying data stored therein following said storing of said decoded specific identifying data in said replacement microcomputer.

19. A replacement microcomputer for a radiotelephone unit in accordance with claim 18 further comprising means for indicating a "fail" condition if said program message is not received.

20. A method of transferring specific identifying data from a radiotelephone unit having the specific identifying data stored in a first memory medium associated with a first microcomputer to a second memory medium associated with a second microcomputer, comprising the steps of:
   receiving a seed number from the second microcomputer whereby a request for transfer of the specific identifying data is initiated;
   reading the specific identifying data from the first memory medium in response to said receiving a seed number;
   generating an operative number from said seed number;
   encoding said specific identifying data by arithmetically combining said operative number and the specific identifying data;
   sending said encoded specific identifying data to said second microcomputer;
   receiving a validity pass message from said second microcomputer; and
   deleting the specific identifying data from the first memory medium in response to said validity pass message.

21. A method in accordance with the method of claim 20 further comprising the step of sending a program message in response to said receiving a validity pass message.

22. A method in accordance with the method of claim 21 further comprising the step of encoding said program message with a second operative number.

23. A method of receiving specific identifying data at a replacement microcomputer for a radiotelephone unit adapted to receive secure specific identifying data stored in a second radiotelephone microcomputer to be replaced, comprising:
   generating a seed number;
   generating an operative number from said generated seed number;
   decoding specific identifying data encoded by and received from the second microcomputer by employing said operative number;
   temporarily storing said decoded specific identifying data;
   checking the validity of said decoded specific identifying data;
   receiving a program message from the second radiotelephone microcomputer; and
   permanently storing said temporarily stored decoded specific identifying data; and commanding said second radiotelephone microcomputer to delete said specific identifying data stored therein following said storing of said decoded specific identifying data in said replacement microcomputer.

24. A method in accordance with the method of claim 23 further comprising the step of indicating a "fail" condition if said program message is not received.

25. A method of transferring radio specific data between a radiotelephone unit first microcomputer and associated memory and a second microcomputer and associated memory, comprising the steps of:
   generating a seed number at the second microcomputer;
   conveying said generating seed number to the first radiotelephone unit microcomputer;
   generating an operative number from said generated seed number at the first microcomputer and the second microcomputer;
   encoding the radio specific data from the first microcomputer associated memory by arithmetically combining said operative number and the radio specific data;
   conveying said encoded radio specific data to the second microcomputer;
   decoding said conveyed encoded radio specific data at the second microcomputer;
   temporarily storing said decoded radio specific data in the second microcomputer associated memory;
   checking the validity of said decoded specific identifying data;
   conveying a validity pass message to the first microcomputer if said decoded specific identifying data is valid;
   receiving said validity pass message;
   sending a program message to the second microcomputer in response to said receiving of said validity pass message;
   permanently storing said temporarily stored identifying data in the second microcomputer associated memory in response to said program message; and
   deleting the radio specific data from the first microcomputer memory in response to said validity pass message.

* * * * *

UNITED STATES PATENT AND TRADEMARK OFFICE
CERTIFICATE OF CORRECTION

PATENT NO.  : 4,811,377
DATED       : Mar. 7, 1989
INVENTOR(S) : Krolopp et al.

It is certified that error appears in the above-identified patent and that said Letters Patent is hereby corrected as shown below:

Col. 8, line 31, delete "and associated memory medium"

Signed and Sealed this

Seventeenth Day of April, 1990

Attest:

HARRY F. MANBECK, JR.

*Attesting Officer*  *Commissioner of Patents and Trademarks*